US010230758B2

(12) United States Patent
Shaulov et al.

(10) Patent No.: US 10,230,758 B2
(45) Date of Patent: *Mar. 12, 2019

(54) ANTI-MALWARE DETECTION AND REMOVAL SYSTEMS AND METHODS

(71) Applicant: CHECKPOINT MOBILE SECURITY LTD, Tel Aviv (IL)

(72) Inventors: Michael Shaulov, Haifa (IL); Ohad Bobrov, Kohav Yair (IL)

(73) Assignee: CHECKPOINT MOBILE SECURITY LTD, Tel Aviv (IL)

( * ) Notice: Subject to any disclaimer, the term of this patent is extended or adjusted under 35 U.S.C. 154(b) by 119 days.

This patent is subject to a terminal disclaimer.

(21) Appl. No.: 15/001,272

(22) Filed: Jan. 20, 2016

(65) Prior Publication Data
US 2016/0142425 A1    May 19, 2016

Related U.S. Application Data

(63) Continuation of application No. 14/400,502, filed as application No. PCT/IL2013/050415 on May 12, 2013, now Pat. No. 9,319,427.
(Continued)

(51) Int. Cl.
*H04L 29/06*    (2006.01)
*G06F 21/56*    (2013.01)

(52) U.S. Cl.
CPC .......... *H04L 63/145* (2013.01); *G06F 21/565* (2013.01); *G06F 21/568* (2013.01);
(Continued)

(58) Field of Classification Search
USPC ............ 726/3, 2, 21, 36; 713/150, 163, 181; 380/255, 264, 276
See application file for complete search history.

(56) References Cited

U.S. PATENT DOCUMENTS 8,255,517 B1 * 8/2012 Hernacki ............... H04W 12/08
709/224
8,566,932 B1 * 10/2013 Hotta ...................... G06F 11/00
726/2
(Continued)

OTHER PUBLICATIONS

"Maware Risks and Mitigation Report"—BITS, Jun. 2011 http://www.nist.gov/itl/upload/BITS-Malware-Report-Jun2011.pdf.

*Primary Examiner* — Sharif E Ullah
(74) *Attorney, Agent, or Firm* — Mark M. Friedman

(57) ABSTRACT

An anti-malware system including at least one database, remote from a plurality of computers to be protected, which stores identification of computer applications resident on the computers to be protected and an application-specific communications footprint for the computer applications, and at least one server, remote from the plurality of computers to be protected, and being operative to calculate a reference computer-specific communications composite pattern based on multiple application-specific communications footprints for applications installed on the computers to be protected, calculate a current computer-specific communications composite pattern based on actual communications of at least one the plurality of computers to be protected, and provide an alert when the current computer-specific communications composite pattern of the at least one of the plurality of computers to be protected differs from the reference computer-specific communications composite pattern of the at least one of the plurality of computers to be protected.

5 Claims, 5 Drawing Sheets

Related U.S. Application Data

(60) Provisional application No. 61/646,298, filed on May 13, 2012, provisional application No. 61/737,852, filed on Dec. 17, 2012.

(52) U.S. Cl.
CPC ...... H04L 63/1416 (2013.01); H04L 63/1425 (2013.01); H04L 63/1441 (2013.01); *G06F 2221/2101* (2013.01)

(56) References Cited

U.S. PATENT DOCUMENTS

| | | | |
|---|---|---|---|
| 8,621,559 B2* | 12/2013 | Alperovitch | H04L 63/20 380/232 |
| 8,776,218 B2 | 6/2014 | Wright | |
| 2003/0020046 A1 | 1/2003 | Leyrer et al. | |
| 2003/0200460 A1* | 10/2003 | Morota | G06F 21/554 726/24 |
| 2005/0026833 A1* | 2/2005 | Rabbani | G01N 33/57434 514/11.8 |
| 2005/0268338 A1* | 12/2005 | Made | G06F 21/562 726/24 |
| 2006/0120526 A1* | 6/2006 | Boucher | G06F 21/6218 380/247 |
| 2007/0000602 A1 | 1/2007 | Roychowdhary et al. | |
| 2007/0006026 A1 | 1/2007 | Roychowdhary et al. | |
| 2008/0086776 A1* | 4/2008 | Tuvell | G06F 21/564 726/24 |
| 2009/0019929 A1 | 1/2009 | Kingdon | |
| 2009/0199296 A1 | 8/2009 | Xie et al. | |
| 2011/0002311 A1 | 1/2011 | Wright | |
| 2011/0014592 A1 | 1/2011 | Kumar | |
| 2011/0023118 A1 | 1/2011 | Wright | |
| 2011/0031454 A1 | 2/2011 | Ho et al. | |
| 2011/0145920 A1 | 6/2011 | Mahaffey et al. | |
| 2011/0314542 A1* | 12/2011 | Viswanathan | G06F 21/554 726/23 |
| 2012/0222120 A1* | 8/2012 | Rim | G06F 21/566 726/24 |
| 2013/0097710 A1* | 4/2013 | Basavapatna | H04W 4/02 726/25 |
| 2013/0167231 A1* | 6/2013 | Raman | H04L 63/1416 726/23 |
| 2014/0053267 A1* | 2/2014 | Klein | G06F 21/552 726/23 |

* cited by examiner

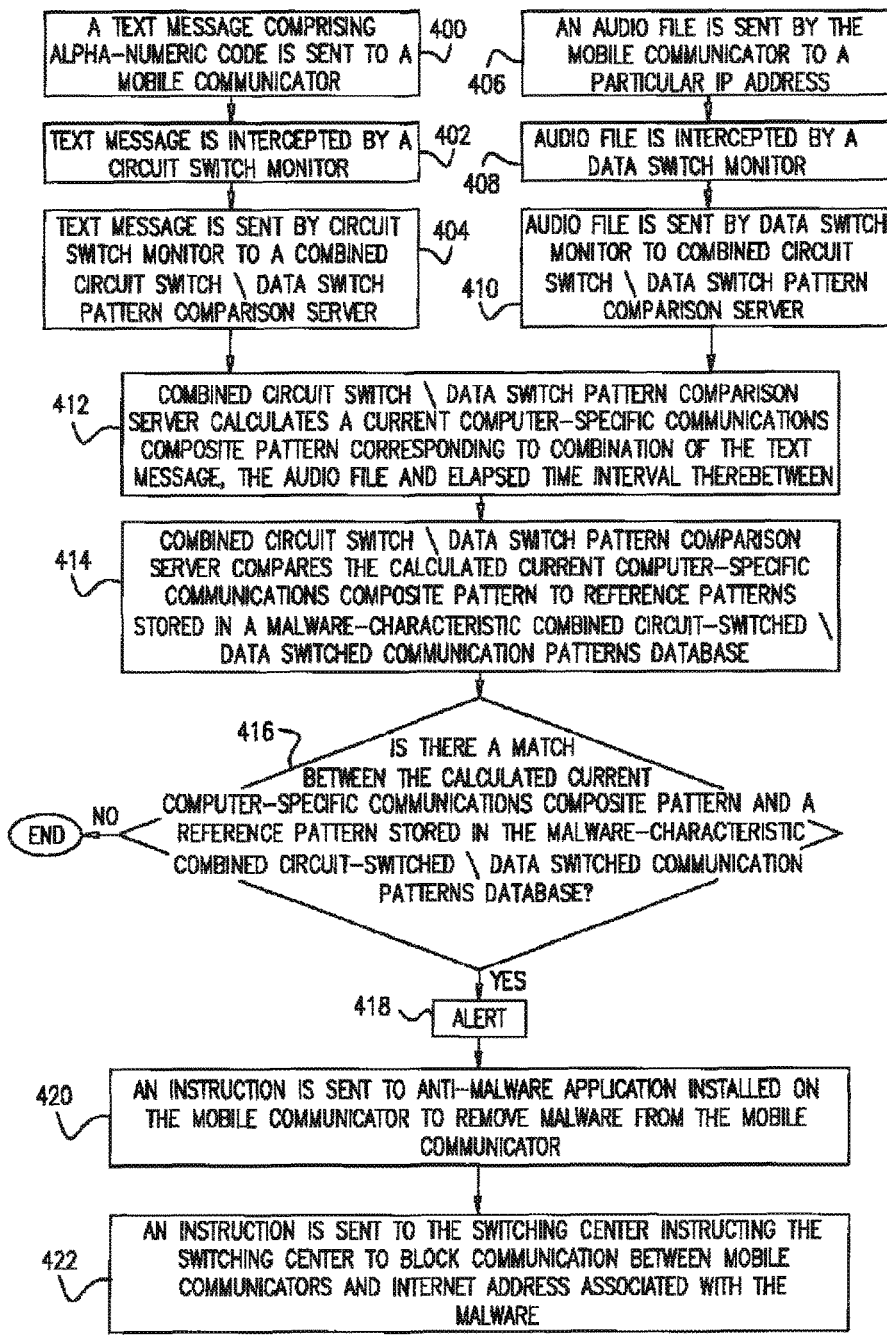

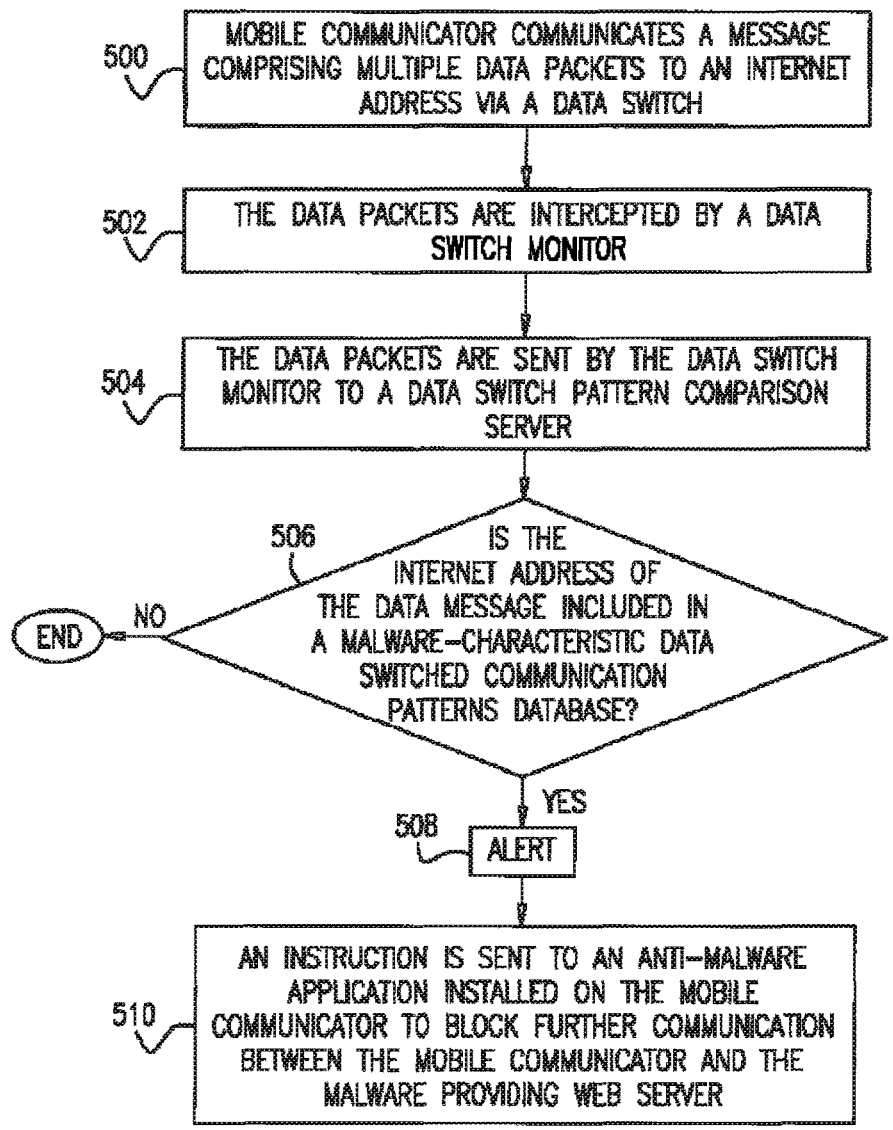

ANTI-MALWARE DETECTION AND REMOVAL SYSTEMS AND METHODS

CROSS REFERENCE TO RELATED APPLICATIONS

This application is a National Stage of International Application No. PCT/IL2013/050415 filed May 12, 2013, reference is made to U.S. Provisional Patent Application Ser. No. 61/646,298, filed May 13, 2012 and entitled "AN APPARATUS AND METHODS THEREOF FOR DETECTING AND PREVENTING MOBILE MALWARE" and from U.S. Provisional Patent Application Ser. No. 61/737,852, filed Dec. 17, 2012 and entitled "ANTI-MALWARE DETECTION AND REMOVAL SYSTEMS AND METHODS", the disclosures of which are hereby incorporated by reference and priority of which is hereby claimed pursuant to 37 CFR 1.78(a) (4) and (5)(i).

FIELD OF THE INVENTION

The present invention relates generally to anti-malware detection and removal systems and methodologies.

BACKGROUND OF THE INVENTION

With the widespread infiltration of malware to computers in general and to mobile communicator deices in particular, a need has arisen for automatic detection and removal of malware from computers and mobile communicator devices.

SUMMARY OF THE INVENTION

The present invention seeks to provide anti-malware detection and removal systems and methodologies.

There is thus provided in accordance with a preferred embodiment of the present invention an anti-malware system including at least one database, remote from a plurality of computers to be protected, which stores identification of the computer applications resident on each of the computers to be protected and an application-specific communications footprint for each of the computer applications, and at least one server, remote from the plurality of computers to be protected, and being operative to calculate a reference computer-specific communications composite pattern based on multiple application-specific communications footprints for applications installed on each of the computers to be protected, calculate a current computer-specific communications composite pattern based on actual communications of at least one the plurality of computers to be protected, and provide an alert when the current computer-specific communications composite pattern of the at least one of the plurality of computers to be protected differs from the reference computer-specific communications composite pattern of the at least one of the plurality of computers to be protected as indicated by at least one metric.

Preferably, the at least one database also includes non application-specific and non malware-characteristic communication footprints.

In accordance with a preferred embodiment of the present invention, the at least one server is operative to provide the alert only when the current computer-specific communications composite pattern of the at least one of the plurality of computers to be protected is not included in the non application-specific and non malware-characteristic communication footprints.

Preferably, the system also includes a monitor, resident on each of a plurality of computers to be protected, which identifies computer applications installed thereon. Preferably, at least some of the application-specific communications footprints are computer type specific. Preferably, the computers to be protected are embodied in mobile communicators.

In accordance with a preferred embodiment of the present invention, the system also includes a malware-characteristic circuit switched communication patterns database which stores malware-characteristic circuit switched communication patterns which are characteristic of at least one of imminent installation, presence and operation of malware on the plurality of computers to be protected, at least one circuit switch monitor associated with the circuit switch for sensing current circuit switched communication patterns being communicated via the circuit switch, and at least one server, associated with the malware-characteristic circuit switched communication patterns database, operable for comparing the current circuit switched communication patterns sensed by the at least one circuit switch monitor with the malware-characteristic circuit switched communication patterns stored on the malware-characteristic circuit switched communication patterns database, and for providing an alert when at least one of the current circuit switched communication patterns is similar to at least one of the malware-characteristic circuit switched communication patterns as indicated by at least one metric.

Preferably, the at least one server associated with the malware-characteristic circuit switched communication patterns database is also operative to proactively send at least one malware triggering message to at least one of the plurality of computers to be protected in order to attempt to elicit communication of at least one of the malware-characteristic circuit switched communication patterns by the at least one of the plurality of computers to be protected, and to thereby confirm the existence of at least one of imminent installation, presence and operation of malware on the at least one of the plurality of computers to be protected.

Preferably, the at least one circuit switch monitor resides on at least one of the plurality of computers to be protected.

Preferably, when the at least one circuit switch monitor resides on at least one of the plurality of computers to be protected, the current circuit switched communication patterns sensed by the at least one circuit switch monitor also include information relating to the state of the at least one of the plurality of computers to be protected. Additionally, the information relating to the state of the at least one of the plurality of computers to be protected includes at least one of an on\off state of a screen of the at least one of the plurality of computers to be protected, a type of wireless connection or protocol utilized by the at least one of the plurality of computers to be protected to communicate with the circuit switch and whether the at least one of the plurality of computers to be protected is connected to an electrical charger.

Preferably, at least some of the malware-characteristic circuit switched communication patterns are computer-type specific.

In accordance with a preferred embodiment of the present invention, the system also includes a malware-characteristic data switched communication patterns database which stores malware-characteristic data switched communication patterns which are characteristic of at least one of imminent installation, presence and operation of malware on the plurality of computers to be protected, at least one data switch monitor associated with the data switch for sensing current data switched communication patterns being communicated via the data switch, and at least one server, associated with the data switched communication patterns database, operable for comparing the current data switched communication patterns sensed by the at least one data switch monitor with the malware-characteristic data switched communication patterns stored on the data switched communication patterns database, and for providing an alert when at least one of the current data switched communication patterns is similar to at least one of the malware-characteristic data switched communication patterns as indicated by at least one metric.

Preferably, the at least one server associated with the malware-characteristic data switched communication patterns database is also operative to proactively send at least one malware triggering message to at least one of the plurality of computers to be protected in order to attempt to elicit communication of at least one of the malware-characteristic data switched communication patterns by the at least one of the plurality of computers to be protected, and to thereby confirm the existence of at least one of imminent installation, presence and operation of malware on the at least one of the plurality of computers to be protected.

Preferably, at least some of the malware-characteristic data switched communication patterns are computer-type specific.

In accordance with a preferred embodiment of the present invention, the system also includes a malware-characteristic combined patterns database which stores malware-characteristic combined circuit-switched communication patterns and data-switched communication patterns which are characteristic of at least one of imminent installation, presence and operation of malware on the plurality of computers to be protected, and at least one server, associated with the malware-characteristic combined patterns database, operable for comparing combinations of current circuit-switched communication patterns and current data-switched communication patterns sensed by the at least one circuit switch monitor and by the at least one data switch monitor with the malware-characteristic combined circuit-switched communication patterns and data-switched communication patterns stored on malware-characteristic combined patterns database, and for providing an alert when at least one of the combinations of current circuit-switched communication patterns and current data-switched communication patterns is similar to at least one of the malware-characteristic combined circuit-switched communication patterns and data-switched communication patterns as indicated by at least one metric.

Preferably, the at least one server associated with the malware-characteristic combined patterns database is also operative to proactively send at least one malware triggering message to at least one of the plurality of computers to be protected in order to attempt to elicit communication of at least one of the malware-characteristic combined patterns by the at least one of the plurality of computers to be protected, and to thereby confirm the existence of at least one of imminent installation, presence and operation of malware on the at least one of the plurality of computers to be protected.

There is also provided in accordance with another preferred embodiment of the present invention an anti-malware system for mobile communicators which communicate via a circuit switch and via a data switch, the system including a malware-characteristic circuit switched communication patterns database which stores malware-characteristic circuit switched communication patterns which are characteristic of at least one of imminent installation, presence and operation of malware on the mobile communicators, at least one circuit switch monitor associated with the circuit switch for sensing current circuit switched communication patterns being communicated via the circuit switch, and at least one server, associated with the malware-characteristic circuit switched communication patterns, for comparing the current circuit switched communication patterns sensed by the at least one circuit switch monitor with the malware-characteristic circuit switched communication patterns stored on the malware-characteristic circuit switched communication patterns database and for providing an alert when at least one of the current circuit switched communication patterns is similar to at least one of the malware-characteristic circuit switched communication patterns as indicated by at least one metric.

Preferably, the at least one server associated with the malware-characteristic circuit switched communication patterns database is also operative to proactively send at least one malware triggering message to at least one of the mobile communicators in order to attempt to elicit communication of at least one of the malware-characteristic circuit switched communication patterns by the at least one of the mobile communicators, and to thereby confirm the existence of at least one of imminent installation, presence and operation of malware on the at least one of the mobile communicators.

Preferably, the at least one circuit switch monitor resides on at least one of the mobile communicators.

Preferably, when the at least one circuit switch monitor resides on at least one of the mobile communicators, the current circuit switched communication patterns sensed by the at least one circuit switch monitor also include information relating to the state of the at least one of the mobile communicators. Additionally, the information relating to the state of the at least one of the mobile communicators includes at least one of an on\off state of a screen of the at least one of the mobile communicators, a type of wireless connection or protocol utilized by the at least one of the mobile communicators to communicate with the circuit switch and whether the at least one of the mobile communicators is connected to an electrical charger.

Preferably, the malware-characteristic circuit switched communication patterns are mobile communicator type specific.

In accordance with a preferred embodiment of the present invention, the system also includes a malware-characteristic data switched communication patterns database which stores malware-characteristic data switched communication patterns which are characteristic of at least one of imminent installation, presence and operation of malware on the mobile communicators, at least one data switch monitor associated with the data switch for sensing current data switched communication patterns being communicated via the data switch, and at least one server, associated with the malware-characteristic data switched communication patterns database, for comparing the current data switched communication patterns sensed by the at least one data switch monitor with the malware-characteristic data switched communication patterns stored on the malware-characteristic data switched communication patterns database and for providing an alert when at least one of the current data switched communication patterns is similar to at least one of the malware-characteristic data switched communication patterns as indicated by at least one metric.

Preferably, the at least one server associated with the malware-characteristic data switched communication patterns database is also operative to proactively send at least one malware triggering message to at least one of the mobile communicators in order to attempt to elicit communication of at least one of the malware-characteristic data switched communication patterns by the at least one of the mobile communicators, and to thereby confirm the existence of at least one of imminent installation, presence and operation of malware on the at least one of the mobile communicators.

Preferably, at least some of the malware-characteristic data switched communication patterns are mobile communicator type specific.

In accordance with a preferred embodiment of the present invention, the system also includes a malware-characteristic combined patterns database which stores malware-characteristic combined circuit-switched communication patterns and data-switched communication patterns which are characteristic of at least one of imminent installation, presence and operation of malware on the mobile communicators and at least one server, associated with the malware-characteristic combined patterns database, operable for comparing combinations of current circuit-switched communication patterns and current data-switched communication patterns sensed by the at least one circuit switch monitor and by the at least one data switch monitor with the malware-characteristic combined circuit-switched communication patterns and data-switched communication patterns stored on malware-characteristic combined patterns database, and for providing an alert when at least one of the combinations of current circuit-switched communication patterns and current data-switched communication patterns are similar to at least one of the malware-characteristic combined circuit-switched communication patterns and data-switched communication patterns as indicated by at least one metric.

Preferably, the at least one server associated with the malware-characteristic combined patterns database is also operative to proactively send at least one malware triggering message to at least one of the mobile communicators in order to attempt to elicit communication of at least one of the malware-characteristic combined patterns by the at least one of the mobile communicators, and to thereby confirm the existence of at least one of imminent installation, presence and operation of malware on the at least one of the mobile communicators.

There is further provided in accordance with yet another preferred embodiment of the present invention an anti-malware system for mobile communicators which communicate via a circuit switch and via a data switch, the system including a malware-characteristic data switched communication patterns database which stores malware-characteristic data switched communication patterns which are characteristic of at least one of imminent installation, presence and operation of malware on the mobile communicators, at least one data switch monitor associated with the data switch for sensing current data switched communication patterns being communicated via the data switch, and at least one server, associated with the malware-characteristic data switched communication patterns, for comparing the current data switched communication patterns sensed by the at least one data switch monitor with the malware-characteristic data switched communication patterns stored on the malware-characteristic data switched communication patterns database and for providing an alert when at least one of the current data switched communication patterns is similar to at least one of the malware-characteristic data switched communication patterns as indicated by at least one metric.

Preferably, the at least one server associated with the malware-characteristic data switched communication patterns database is also operative to proactively send at least one malware triggering message to at least one of the mobile communicators in order to attempt to elicit communication of at least one of the malware-characteristic data switched communication patterns by the at least one of the mobile communicators, and to thereby confirm the existence of at least one of imminent installation, presence and operation of malware on the at least one of the mobile communicators.

Preferably, the malware-characteristic data switched communication patterns are mobile communicator type specific.

In accordance with a preferred embodiment of the present invention, the system also includes a malware-characteristic circuit switched communication patterns database which stores malware-characteristic circuit switched communication patterns which are characteristic of at least one of imminent installation, presence and operation of malware on the mobile communicators, at least one circuit switch monitor associated with the circuit switch for sensing current circuit switched communication patterns being communicated via the circuit switch, and at least one server, associated with the malware-characteristic circuit switched communication patterns database, for comparing the current circuit switched communication patterns sensed by the at least one circuit switch monitor with the malware-characteristic circuit switched communication patterns stored on the malware-characteristic circuit switched communication patterns database and for providing an alert when at least one of the current circuit switched communication patterns is similar to at least one of the malware-characteristic circuit switched communication patterns as indicated by at least one metric.

Preferably, the at least one server associated with the malware-characteristic circuit switched communication patterns database is also operative to proactively send at least one malware triggering message to at least one of the mobile communicators in order to attempt to elicit communication of at least one of the malware-characteristic circuit switched communication patterns by the at least one of the mobile communicators, and to thereby confirm the existence of at least one of imminent installation, presence and operation of malware on the at least one of the mobile communicators.

Preferably, the at least one circuit switch monitor resides on at least one of the mobile communicators.

Preferably, when the at least one circuit switch monitor resides on at least one of the mobile communicators, the current circuit switched communication patterns sensed by the at least one circuit switch monitor also include information relating to the state of the at least one of the mobile communicators. Additionally, the information relating to the state of the at least one of the mobile communicators includes at least one of an on\off state of a screen of the at least one of the mobile communicators, a type of wireless connection or protocol utilized by the at least one of the mobile communicators to communicate with the circuit switch and whether the at least one of the mobile communicators is connected to an electrical charger.

Preferably, at least some of the malware-characteristic circuit switched communication patterns are mobile communicator type specific.

In accordance with a preferred embodiment of the present invention, the system also includes a malware-characteristic combined patterns database which stores malware-characteristic combined circuit-switched communication patterns and data-switched communication patterns which are characteristic of at least one of imminent installation, presence and operation of malware on the mobile communicators, and at least one server, associated with the malware-characteristic combined patterns database, operable for comparing combinations of current circuit-switched communication patterns and current data-switched communication patterns sensed by the at least one circuit switch monitor and by the at least one data switch monitor with the malware-characteristic combined circuit-switched communication patterns and data-switched communication patterns stored on malware-characteristic combined patterns database, and for providing an alert when at least one of the combinations of current circuit-switched communication patterns and current data-switched communication patterns are similar to at least one of the malware-characteristic combined circuit-switched communication patterns and data-switched communication patterns as indicated by at least one metric.

Preferably, the at least one server associated with the malware-characteristic combined patterns database is also operative to proactively send at least one malware triggering message to at least one of the mobile communicators in order to attempt to elicit communication of at least one of the malware-characteristic combined patterns by the at least one of the mobile communicators, and to thereby confirm the existence of at least one of imminent installation, presence and operation of malware on the at least one of the mobile communicators.

There is yet further provided in accordance with still another preferred embodiment of the present invention an anti-malware system for mobile communicators which communicate via a circuit switch and via a data switch, the system including a malware-characteristic combined patterns database which stores malware-characteristic combined circuit-switched communication patterns and data-switched communication patterns which are characteristic of at least one of imminent installation, presence and operation of malware on the mobile communicators, at least one circuit switch monitor associated with the circuit switch for sensing current circuit switched communication patterns being communicated via the circuit switch, at least one data switch monitor associated with the data switch for sensing current data switched communication patterns being communicated via the data switch, and at least one server, associated with the malware-characteristic combined patterns database, operable for comparing combinations of current circuit-switched communication patterns and current data-switched communication patterns sensed by the at least one circuit switch monitor and by the at least one data switch monitor with the malware-characteristic combined circuit-switched communication patterns and data-switched communication patterns stored on malware-characteristic combined patterns database, and for providing an alert when at least one of the combinations of current circuit-switched communication patterns and current data-switched communication patterns are similar to at least one of the malware-characteristic combined circuit-switched communication patterns and data-switched communication patterns as indicated by at least one metric.

Preferably, the at least one server associated with the malware-characteristic combined patterns database is also operative to proactively send at least one malware triggering message to at least one of the mobile communicators in order to attempt to elicit communication of at least one of the malware-characteristic combined patterns by the at least one of the mobile communicators, and to thereby confirm the existence of at least one of imminent installation, presence and operation of malware on the at least one of the mobile communicators.

Preferably, the at least one circuit switch monitor resides on at least one of the mobile communicators.

Preferably, when the at least one circuit switch monitor resides on at least one of the mobile communicators, the current circuit switched communication patterns sensed by the at least one circuit switch monitor also include information relating to the state of the at least one of the mobile communicators. Additionally, the information relating to the state of the at least one of the mobile communicators includes at least one of an on\off state of a screen of the at least one of the mobile communicators, a type of wireless connection or protocol utilized by the at least one of the mobile communicators to communicate with the circuit switch and whether the at least one of the mobile communicators is connected to an electrical charger.

Preferably, at least some of the malware-characteristic circuit switched communication patterns are mobile communicator type specific. Preferably, at least some of the malware-characteristic data switched communication patterns are mobile communicator type specific.

There is also provided in accordance with another preferred embodiment of the present invention a method for detecting malware, the method including storing, on at least one database, remote from a plurality of computers to be protected, identification of the computer applications resident on each of the computers to be protected and an application-specific communications footprint for each of the computer applications, and calculating a reference computer-specific communications composite pattern based on multiple application-specific communications footprints for applications installed on each of the computers to be protected, calculating a current computer-specific communications composite pattern based on actual communications of at least one of the plurality of computers to be protected, and providing an alert when the current computer-specific communications composite pattern of the at least one of the plurality of computers to be protected differs from the reference computer-specific communications composite pattern of the at least one of the plurality of computers to be protected as indicated by at least one metric.

Preferably, the at least one database also includes non application-specific and non malware-characteristic communication footprints. Preferably, the method also includes providing the alert only when the current computer-specific communications composite pattern of the at least one the plurality of computers to be protected is not included in the non application-specific and non malware-characteristic communication footprints. Preferably, the method also includes identifying computer applications installed on each of a plurality of computers to be protected. Preferably, at least some of the application-specific communications footprints are also computer type specific. Preferably, the computers to be protected are embodied in mobile communicators.

In accordance with a preferred embodiment of the present invention, the method also includes storing, on a malware-characteristic circuit switched communication patterns database, malware-characteristic circuit switched communication patterns which are characteristic of at least one of imminent installation, presence and operation of malware on the plurality of computers to be protected, monitoring the circuit switch for sensing current circuit switched communication patterns being communicated via the circuit switch, and comparing the current circuit switched communication patterns sensed by the monitoring the circuit switch with the malware-characteristic circuit switched communication patterns stored on the malware-characteristic circuit switched communication patterns database, and providing an alert when at least one of the current circuit switched communication patterns is similar to at least one of the malware-characteristic circuit switched communication patterns as indicated by at least one metric.

Preferably, the method also includes proactively sending at least one malware triggering message to at least one of the plurality of computers to be protected in order to attempt to elicit communication of at least one of the malware-characteristic circuit switched communication patterns by the at least one of the plurality of computers to be protected, and to thereby confirm the existence of at least one of imminent installation, presence and operation of malware on the at least one of the plurality of computers to be protected.

Preferably, the method also includes monitoring at least one of the plurality of computers to be protected for information relating to the state of the at least one of the plurality of computers to be protected, wherein the current circuit switched communication patterns also include the information relating to the state of the at least one of the plurality of computers to be protected. Additionally, the information relating to the state of the at least one of the plurality of computers to be protected includes at least one of an on\off state of a screen of the at least one of the plurality of computers to be protected, a type of wireless connection or protocol utilized by the at least one of the plurality of computers to be protected to communicate with the circuit switch and whether the at least one of the plurality of computers to be protected is connected to an electrical charger.

Preferably, at least some of the malware-characteristic circuit switched communication patterns are mobile computer-type specific.

In accordance with a preferred embodiment of the present invention, the method also includes storing, on a malware-characteristic data switched communication patterns database, malware-characteristic data switched communication patterns which are characteristic of at least one of imminent installation, presence and operation of malware on the plurality of computers to be protected, monitoring the data switch for sensing current data switched communication patterns being communicated via the data switch, and comparing the current data switched communication patterns sensed by the monitoring the data switch with the malware-characteristic data switched communication patterns stored on the data switched communication patterns database, and providing an alert when at least one of the current data switched communication patterns is similar to at least one of the malware-characteristic data switched communication patterns as indicated by at least one metric.

Preferably, the method also includes proactively sending at least one malware triggering message to at least one of the plurality of computers to be protected in order to attempt to elicit communication of at least one of the malware-characteristic data switched communication patterns by the at least one of the plurality of computers to be protected, and to thereby confirm the existence of at least one of imminent installation, presence and operation of malware on the at least one of the plurality of computers to be protected.

Preferably, at least some of the malware-characteristic data switched communication patterns are mobile computer-type specific.

In accordance with a preferred embodiment of the present invention, the method also includes storing, on a malware-characteristic combined patterns database, malware-characteristic combined circuit-switched communication patterns and data-switched communication patterns which are characteristic of at least one of imminent installation, presence and operation of malware on the plurality of computers to be protected, and comparing combinations of current circuit-switched communication patterns and current data-switched communication patterns sensed by the monitoring the circuit switch and the monitoring the data switch with the malware-characteristic combined circuit-switched communication patterns and data-switched communication patterns stored on malware-characteristic combined patterns database, providing an alert when at least one of the combinations of current circuit-switched communication patterns and current data-switched communication patterns is similar to at least one of the malware-characteristic combined circuit-switched communication patterns and data-switched communication patterns as indicated by at least one metric.

Preferably, the method also includes proactively sending at least one malware triggering message to at least one of the plurality of computers to be protected in order to attempt to elicit communication of at least one of the malware-characteristic combined circuit-switched communication patterns and data-switched communication patterns by the at least one of the plurality of computers to be protected, and to thereby confirm the existence of at least one of imminent installation, presence and operation of malware on the at least one of the plurality of computers to be protected.

There is further provided in accordance with yet another preferred embodiment of the present invention a method for detecting malware for mobile communicators which communicate via a circuit switch and via a data switch, the method including storing, on a malware-characteristic circuit switched communication patterns database, malware-characteristic circuit switched communication patterns which are characteristic of at least one of imminent installation, presence and operation of malware on the mobile communicators, monitoring the circuit switch for sensing current circuit switched communication patterns being communicated via the circuit switch, and comparing the current circuit switched communication patterns sensed by the monitoring the circuit switch with the malware-characteristic circuit switched communication patterns stored on the malware-characteristic circuit switched communication patterns database and providing an alert when at least one of the current circuit switched communication patterns is similar to at least one of the malware-characteristic circuit switched communication patterns as indicated by at least one metric.

Preferably, the method also includes proactively sending at least one malware triggering message to at least one of the mobile communicators in order to attempt to elicit communication of at least one of the malware-characteristic circuit switched communication patterns by the at least one of the mobile communicators, and to thereby confirm the existence of at least one of imminent installation, presence and operation of malware on the at least one of the mobile communicators.

Preferably, the method also includes monitoring at least one of the mobile communicators for information relating to the state of the at least one of the mobile communicators, wherein the current circuit switched communication patterns also include the information relating to the state of the at least one of the mobile communicators. Additionally, the information relating to the state of the at least one of the mobile communicators includes at least one of an on\off state of a screen of the at least one of the mobile communicators, a type of wireless connection or protocol utilized by the at least one of the mobile communicators to communicate with the circuit switch and whether the at least one of the mobile communicators is connected to an electrical charger.

Preferably, the malware-characteristic circuit switched communication patterns are mobile communicator type specific.

In accordance with a preferred embodiment of the present invention, the method also includes storing, on a malware-characteristic data switched communication patterns database, malware-characteristic data switched communication patterns which are characteristic of at least one of imminent installation, presence and operation of malware on the mobile communicators, monitoring the data switch for sensing current data switched communication patterns being communicated via the data switch, and comparing the current data switched communication patterns sensed by the monitoring the data switch with the malware-characteristic data switched communication patterns stored on the malware-characteristic data switched communication patterns database, and providing an alert when at least one of the current data switched communication patterns is similar to at least one of the malware-characteristic data switched communication patterns as indicated by at least one metric.

Preferably, the method also includes proactively sending at least one malware triggering message to at least one of the mobile communicators in order to attempt to elicit communication of at least one of the malware-characteristic data switched communication patterns by the at least one of the mobile communicators, and to thereby confirm the existence of at least one of imminent installation, presence and operation of malware on the at least one of the mobile communicators.

Preferably, at least some of the malware-characteristic data switched communication patterns are mobile communicator type specific.

In accordance with a preferred embodiment of the present invention, the method also includes storing, on a malware-characteristic combined patterns database, malware-characteristic combined circuit-switched communication patterns and data-switched communication patterns which are characteristic of at least one of imminent installation, presence and operation of malware on the mobile communicators and comparing combinations of current circuit-switched communication patterns and current data-switched communication patterns sensed by the monitoring the circuit switch and the monitoring the data switch with the malware-characteristic combined circuit-switched communication patterns and data-switched communication patterns stored on malware-characteristic combined patterns database, and providing an alert when at least one of the combinations of current circuit-switched communication patterns and current data-switched communication patterns are similar to at least one of the malware-characteristic combined circuit-switched communication patterns and data-switched communication patterns as indicated by at least one metric.

Preferably, the method also includes proactively sending at least one malware triggering message to at least one of the mobile communicators in order to attempt to elicit communication of at least one of the malware-characteristic combined circuit-switched communication patterns and data-switched communication patterns by the at least one of the mobile communicators, and to thereby confirm the existence of at least one of imminent installation, presence and operation of malware on the at least one of mobile communicators.

There is yet further provided in accordance with still another preferred embodiment of the present invention a method for detecting malware for mobile communicators which communicate via a circuit switch and via a data switch, the method including storing, on a malware-characteristic data switched communication patterns database, malware-characteristic data switched communication patterns which are characteristic of at least one of imminent installation, presence and operation of malware on the mobile communicators, monitoring the data switch for sensing current data switched communication patterns being communicated via the data switch, and comparing the current data switched communication patterns sensed by the monitoring the data switch with the malware-characteristic data switched communication patterns stored on the malware-characteristic data switched communication patterns database and providing an alert when at least one of the current data switched communication patterns is similar to at least one of the malware-characteristic data switched communication patterns as indicated by at least one metric.

Preferably, the method also includes proactively sending at least one malware triggering message to at least one of the mobile communicators in order to attempt to elicit communication of at least one of the malware-characteristic data switched communication patterns by the at least one of the mobile communicators, and to thereby confirm the existence of at least one of imminent installation, presence and operation of malware on the at least one of the mobile communicators.

Preferably, the malware-characteristic data switched communication patterns are mobile communicator type specific.

In accordance with a preferred embodiment of the present invention, the method also includes storing, on a malware-characteristic circuit switched communication patterns database, malware-characteristic circuit switched communication patterns which are characteristic of at least one of imminent installation, presence and operation of malware on the mobile communicators, monitoring the circuit switch for sensing current circuit switched communication patterns being communicated via the circuit switch, and comparing the current circuit switched communication patterns sensed by the monitoring the circuit switch with the malware-characteristic circuit switched communication patterns stored on the malware-characteristic circuit switched communication patterns database and providing an alert when at least one of the current circuit switched communication patterns is similar to at least one of the malware-characteristic circuit switched communication patterns as indicated by at least one metric.

Preferably, the method also includes proactively sending at least one malware triggering message to at least one of the mobile communicators in order to attempt to elicit communication of at least one of the malware-characteristic circuit switched communication patterns by the at least one of the mobile communicators, and to thereby confirm the existence of at least one of imminent installation, presence and operation of malware on the at least one of the mobile communicators.

Preferably, the method also includes monitoring at least one of the mobile communicators for information relating to the state of the at least one of the mobile communicators, wherein the current circuit switched communication patterns also include the information relating to the state of the at least one of the mobile communicators. Additionally, the information relating to the state of the at least one of the mobile communicators includes at least one of an on\off state of a screen of the at least one of the mobile communicators, a type of wireless connection or protocol utilized by the at least one of the mobile communicators to communicate with the circuit switch and whether the at least one of the mobile communicators is connected to an electrical charger.

Preferably, at least some of the malware-characteristic circuit switched communication patterns are mobile communicator type specific.

In accordance with a preferred embodiment of the present invention, the method also includes storing, on a malware-characteristic combined patterns database, malware-characteristic combined circuit-switched communication patterns and data-switched communication patterns which are characteristic of at least one of imminent installation, presence and operation of malware on the mobile communicators, and comparing combinations of current circuit-switched communication patterns and current data-switched communication patterns sensed by the monitoring the data switch and the monitoring the circuit switch with the malware-characteristic combined circuit-switched communication patterns and data-switched communication patterns stored on malware-characteristic combined patterns database, and providing an alert when at least one of the combinations of current circuit-switched communication patterns and current data-switched communication patterns are similar to at least one of the malware-characteristic combined circuit-switched communication patterns and data-switched communication patterns as indicated by at least one metric.

Preferably, the method also includes proactively sending at least one malware triggering message to at least one of the mobile communicators in order to attempt to elicit communication of at least one of the malware-characteristic combined circuit-switched communication patterns and data-switched communication patterns by the at least one of the mobile communicators, and to thereby confirm the existence of at least one of imminent installation, presence and operation of malware on the at least one of mobile communicators.

There is yet further provided in accordance with still another preferred embodiment of the present invention a method for detecting malware for mobile communicators which communicate via a circuit switch and via a data switch, the method including storing, on a malware-characteristic combined patterns database, malware-characteristic combined circuit-switched communication patterns and data-switched communication patterns which are characteristic of at least one of imminent installation, presence and operation of malware on the mobile communicators, monitoring the circuit switch for sensing current circuit switched communication patterns being communicated via the circuit switch, monitoring the data switch for sensing current data switched communication patterns being communicated via the data switch, and comparing combinations of current circuit-switched communication patterns and current data-switched communication patterns sensed by the monitoring the circuit switch and by the monitoring the data switch with the malware-characteristic combined circuit-switched communication patterns and data-switched communication patterns stored on malware-characteristic combined patterns database, and providing an alert when at least one of the combinations of current circuit-switched communication patterns and current data-switched communication patterns are similar to at least one of the malware-characteristic combined circuit-switched communication patterns and data-switched communication patterns as indicated by at least one metric.

Preferably, the method also includes proactively sending at least one malware triggering message to at least one of the mobile communicators in order to attempt to elicit communication of at least one of the malware-characteristic combined circuit-switched communication patterns and data-switched communication patterns by the at least one of mobile communicators, and to thereby confirm the existence of at least one of imminent installation, presence and operation of malware on the at least one of the mobile communicators.

Preferably, the method also includes monitoring at least one of the mobile communicators for information relating to the state of the at least one of the mobile communicators, wherein the current circuit switched communication patterns also include the information relating to the state of the at least one of the mobile communicators. Additionally, the information relating to the state of the at least one of the mobile communicators includes at least one of an on\off state of a screen of the at least one of the mobile communicators, a type of wireless connection or protocol utilized by the at least one of the mobile communicators to communicate with the circuit switch and whether the at least one of the mobile communicators is connected to an electrical charger.

Preferably, at least some of the malware-characteristic circuit switched communication patterns are mobile communicator type specific. Preferably, at least some of the malware-characteristic data switched communication patterns are mobile communicator type specific.

BRIEF DESCRIPTION OF THE DRAWINGS

The present invention will be understood and appreciated more fully from the following detailed description, taken in conjunction with the drawings in which:

FIG. 4 is a simplified block diagram illustration of yet another example of steps in the operation of the system of FIG. 1; and FIG. 5 is a simplified block diagram illustration of yet another example of steps in the operation of the system of FIG. 1.

DETAILED DESCRIPTION OF A PREFERRED EMBODIMENT

Figure 1:
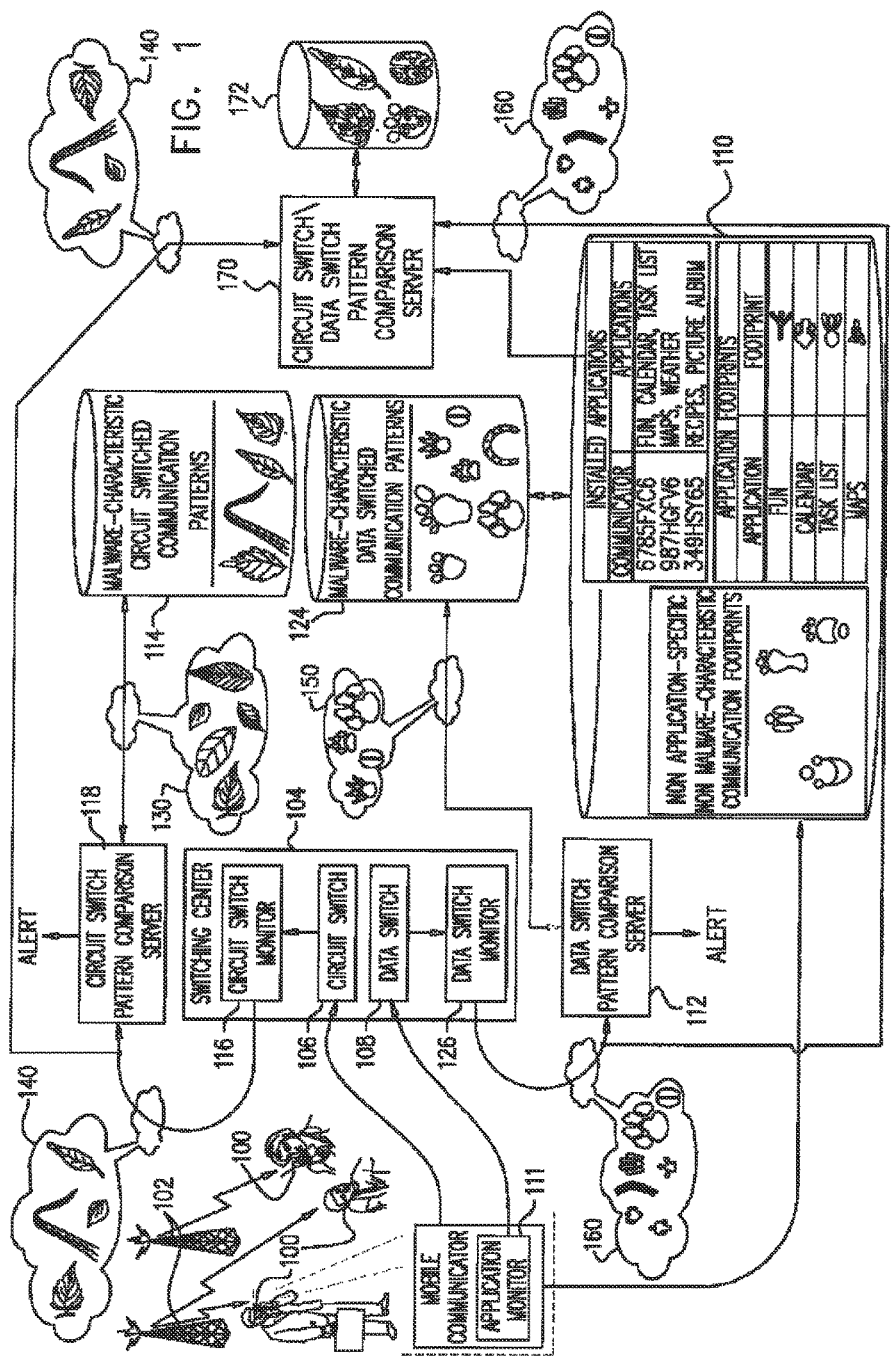
FIG. 1 is a simplified symbolic functional block diagram illustration of an anti-malware system and its functionality in accordance with a preferred embodiment of the present invention.

Reference is now made to FIG. 1, which is a simplified symbolic functional block diagram illustration of an anti-malware system and its functionality in accordance with a preferred embodiment of the present invention.

As seen in FIG. 1, the anti-malware system and functionality of the present invention preferably operates in the context of a computer network, more preferably a mobile computer network and most preferably a mobile communicator network, such as a cellular telephone network providing voice, messaging and data communication functionality.

FIG. 1 shows the most preferred context in which a multiplicity of mobile communicators 100, such as smartphones and tablets, are connected, typically via cellular transceivers 102, to a cellular network switching center 104 including a circuit switch 106, which deals with voice and messaging communication and a data switch 108, which deals with data communication. It is appreciated that alternatively, the data communication may be carried over an alternative wired or wireless medium, such as WIFI or broadband.

In accordance with a preferred embodiment of the invention, at least one database 110, remote from a plurality of computers, such as mobile communicators 100, to be protected stores:

identification of computer applications, such as mobile communicator apps, resident on each of the computers, typically mobile communicators 100, to be protected;

an application-specific communications footprint for each of the computer applications; and non application-specific and non malware-characteristic communication footprints. The non application-specific and non malware-characteristic communication footprints may include, for example, communication footprints between mobile communicators and websites which websites are not associated with any known malware.

The at least one database 110 may be located at any suitable physical location or may reside on the cloud. At least one database 110 is preferably at least partially populated by an application monitor 111, resident on each of a plurality of computers, such as mobile communicators 100, to be protected, which identifies computer applications installed thereon. It is appreciated that the application-specific communications footprint for each of the computer applications may be retrieved, for example, from a continuously updated repository of computer application footprints.

At least one server 112, typically remote from the plurality of computers, such as mobile communicators 100, to be protected, is preferably operative to:

calculate a reference computer-specific communications composite pattern based on multiple application-specific communications footprints for applications installed on each of the computers, typically mobile communicators 100, to be protected;

calculate a current computer-specific communications composite pattern based on actual communications of at least one of said plurality of computers, typically mobile communicators 100, to be protected; and provide an alert when the current computer-specific communications composite pattern of the at least one of said plurality of computers to be protected differs from the reference computer-specific communications composite pattern of the at least one of the plurality of computers to be protected, as indicated by at least one metric, and is not included in the non application-specific and non malware-characteristic communication footprints.

Preferably, database 110 provides information which is used by server 112 in calculating a reference computer-specific communications composite pattern based on multiple application-specific communications footprints for applications installed on each of the computers, typically mobile communicators 100, to be protected.

In accordance with a preferred embodiment of the invention, the system also includes a database 114 which stores malware-characteristic circuit-switched communication patterns which are characteristic of at least one of imminent installation, presence and operation of malware on mobile communicators 100.

At least one monitor 116 is preferably associated with circuit switch 106 for sensing current circuit switched communication patterns being communicated via circuit switch 106. It is appreciated that monitor 116 may reside on at least some of mobile communicators 100. It is appreciated that in a case where monitor 116 resides on a mobile communicator 100, current circuit switched communication patterns sensed by monitor 116 preferably also include information relating to the state of mobile communicator 100. Such information may include, for example, the on\off state of the screen of communicator 100, the type of wireless connection or protocol utilized by communicator 100 to communicate with circuit switch 106 or whether communicator 100 is connected to an electrical charger.

At least one server 118 is associated with database 114 for comparing the current circuit-switched communication patterns sensed by at least one monitor 116 with malware-characteristic circuit-switched communication patterns stored on database 114 and providing an alert when any of the current circuit switched communication patterns are similar to any of the malware-characteristic circuit switched communication patterns as indicated by at least one metric.

It is appreciated that server 118 may be, for example, a complex event processor, such as an Esper complex event processor available from EsperTech Inc. of Wayne, N.J.

Further in accordance with a preferred embodiment of the invention, the system also includes an additional database 124 which stores malware-characteristic data switched communication patterns which are characteristic of at least one of imminent installation, presence and operation of malware on mobile communicators 100.

At least one additional monitor 126 is associated with data switch 108 for sensing current data switched communication patterns being communicated via data switch 108.

Server 112 is preferably associated with additional database 124 for comparing the current data-switched communication patterns sensed by the at least one additional monitor 126 with malware-characteristic data switched communication patterns stored on the additional database 124, and for providing an alert when the current data switched communication patterns are similar to the malware-characteristic data switched communication patterns as indicated by at least one additional metric.

Preferably, database 110 provides information which is also used by server 112 in comparing the current data switched communication patterns sensed by the at least one additional monitor 126 with malware-characteristic data switched communication patterns stored on the additional database 124.

In accordance with a preferred embodiment of the present invention, the calculated reference circuit-switched communication patterns, here designated by reference numeral 130, are calculated by server 118 using information stored in database 114 relating to a plurality of sequences of circuit switch events which sequences are known to result from at least one of imminent installation, presence and operation of malware on mobile communicators 100. Various circuit switch events are symbolized by different leaf shapes and the calculated circuit-switched communication patterns, are represented by sequences of leaves of different shapes and/or sizes.

Examples of calculated circuit-switched communication patterns which are currently known to result from at least one of imminent installation, presence and operation of malware on mobile communicators 100 include:

a rapid sequence of conference calls, typically wherein at least every second call is a conference call;

a sequence of text messages to telephone numbers which require payment of a toll to the proprietor of the number, typically 30 such calls per month; and a concatenation of a plurality of text messages received by a mobile communicator 100, typically including at least 20 such text messages.

The current circuit-switched communication patterns sensed by at least one monitor 116, here designated by reference numeral 140, are compared by server 118 to calculated reference circuit-switched communication patterns 130 to ascertain the presence of any sequences of current circuit switch events which sequences are known to result from at least one of imminent installation, presence and operation of malware on mobile communicators 100.

It is appreciated that in at least some cases, communication of circuit-switched communication patterns, which am currently known to result from operation of malware, may be communicated by a mobile communicator 100 as a result of a malware triggering message sent to mobile communicator 100 by an operator of the malware, from a location external to mobile communicator 100.

It is therefore also appreciated that the system is also operative, in a case where it is merely suspected that malware resides on a mobile communicator 100, to proactively send at least one malware triggering message to mobile communicator 100 in order to attempt to elicit communication of at least one calculated reference circuit-switched communication pattern 130 by mobile communicator 100, and to thereby confirm the existence of the malware on the mobile communicator. Further in accordance with a preferred embodiment of the present invention, the calculated reference data-switched communication patterns, here designated by reference numeral 150, are calculated by server 112 using information stored in databases 110 and 124, which information includes the following:

- database 110 identifies applications installed on each given mobile communicator 100 and provides information relating to application specific behavior patterns sensible at the data switch 108 which behavior patterns do not result from any of imminent installation, presence and operation of malware on mobile communicators 100; and
- database 124 provides information relating to behavior patterns sensible at the data switch 108, which behavior patterns result from at least one of imminent installation, presence and operation of malware on mobile communicators 100. Various data switch behaviors occurrences are symbolized by different footprints and the calculated data-switched communication patterns are represented by collections of footprints of different shapes and/or sizes.

It is a particular feature of this embodiment of the present invention that the calculated data-switched communication patterns preferably include:

- behavior patterns associated with applications pre-installed by the manufacturer of the mobile communicator on the mobile communicator; and
- behavior patterns associated with the particular applications installed by the user of the mobile communicator on the mobile communicator.

Examples of calculated data-switched communication patterns which are currently known to result from at least one of imminent installation, presence and operation of malware on mobile communicators 100 include:

automatic accessing, by a given mobile communicator, of an internet address which is not one of the internet addresses known to be accessed by any of the applications known to be installed on that given mobile communicator;

automatic utilization, by a given mobile communicator, of an internet protocol which is not one of the internet protocols known to be utilized by any of the applications known to be installed on that given mobile communicator;

automatic accessing, by a given mobile communicator, of an internet address with a frequency which is not characteristic of any of the applications known to be installed on that given mobile communicator; and automatic accessing, by a given mobile communicator, of an internet address with an upload/download ratio, which is not characteristic of any of the applications known to be installed on that given mobile communicator.

The current data-switched communication patterns sensed by at least one monitor 126, designated by reference numeral 160, are analyzed by server 112 using information stored in databases 110 and 124 to ascertain the presence of any current data switch behavior which is known to result from at least one of imminent installation, presence and operation of malware on mobile communicators 100.

It is appreciated that in at least some cases, communication of circuit-switched communication patterns, which are currently known to result from operation of malware, may be communicated by a mobile communicator 100 as a result of a malware triggering message sent to mobile communicator 100 by an operator of the malware, from a location external to mobile communicator 100.

It is therefore also appreciated that the system is also operative, in a case where it is merely suspected that malware resides on a mobile communicator 100, to proactively send at least one malware triggering message to mobile communicator 100 in order to attempt to elicit communication of at least one calculated reference data-switched communication pattern 150 by mobile communicator 100, and to thereby confirm the existence of the malware on the mobile communicator. Further in accordance with a preferred embodiment of the present invention there is provided at least one further server 170, which is associated with a further database 172 for comparing combinations of current circuit-switched communication patterns and current data-switched communication patterns sensed by at least one monitor 116 and at least one monitor 126 with malware-characteristic combined circuit-switched communication patterns and data-switched communication patterns stored on database 172, and for providing an alert when a combination of current circuit-switched communication patterns and current data-switched communication patterns is similar to the malware-characteristic combined circuit-switched communication patterns and data-switched communication patterns as indicated by at least one metric and is not similar to the non malware-characteristic data-switched communication patterns as indicated by at least another metric Database 172 preferably stores reference malware-characteristic combined circuit-switched communication patterns and data-switched communication patterns which are characteristic of at least one of imminent installation, presence and operation of malware on mobile communicators 100.

Server 170 receives inputs from circuit switch monitor 116 and data switch monitor 126, and utilizes data stored on database 110 and database 172 to compare combinations of current circuit-switched communication patterns and current data-switched communication patterns sensed by at least one monitor 116 and at least one monitor 126 with reference malware-characteristic combined circuit-switched communication patterns and data-switched communication patterns, and with reference non application-specific non malware-characteristic communication patterns, and to provide an alert when a combination of current circuit-switched communication patterns and current data-switched communication patterns is similar to one of the reference malware-characteristic combined circuit-switched communication patterns and data-switched communication patterns as indicated by at least one metric and is not similar to one of the non application-specific non malware-characteristic communication patterns as indicated by at least another additional metric.

The current circuit-switched communication patterns sensed by at least one monitor 116, here designated by reference numeral 140, and the current data-switched communication patterns sensed by at least one monitor 126, here designated by reference numeral 160 are together analyzed by server 170 using information stored in databases 110 and 172 in order to ascertain the presence of any combinations of sequences of current circuit switch events and current data switch behavior, which combinations are known to result from at least one of imminent installation, presence and operation of malware on mobile communicators 100. Various combinations of circuit switch events and data switch behaviors are symbolized by different ecosystem symbols comprising leaf shapes and footprints of various shapes and sizes.

Examples of calculated combinations of data-switched communication patterns and circuit switched communication patterns, which are currently known to result from at least one of imminent installation, presence and operation of malware on mobile communicators 100 include:

receiving a text message via circuit switch 106, such as an SMS message, typically including an alpha-numeric code, which code causes the mobile communicator to activate, for a characteristic time interval, built-in sound\voice recording functionality via an integrated microphone associated with the mobile communicator, and to send, following the characteristic time interval, an audio file containing the sound\voice recording to an IP address characteristic of the particular malware; and connecting of a mobile communicator to an IP address characteristic of malware and downloading instructions therefrom, which instructions instruct the mobile communicator to send text messages, such as SMS messages, to a particular telephone which requires payment of a toll to the proprietor of the number, thereby incurring expenses to the user of the mobile communicator.

It is appreciated that in at least some cases, communication of circuit-switched communication patterns, which are currently known to result from operation of malware, may be communicated by a mobile communicator 100 as a result of a malware triggering message sent to mobile communicator 100 by an operator of the malware, from a location external to mobile communicator 100.

It is therefore also appreciated that the system is also operative, in a case where it is merely suspected that malware resides on a mobile communicator 100, to proactively send at least one malware triggering message to mobile communicator 100 in order to attempt to elicit communication of at least one reference malware-characteristic combined circuit-switched communication patterns and data-switched communication patterns such as those stored in database 172 by mobile communicator 100, and to thereby confirm the existence of the malware on the mobile communicator.

Figure 2:
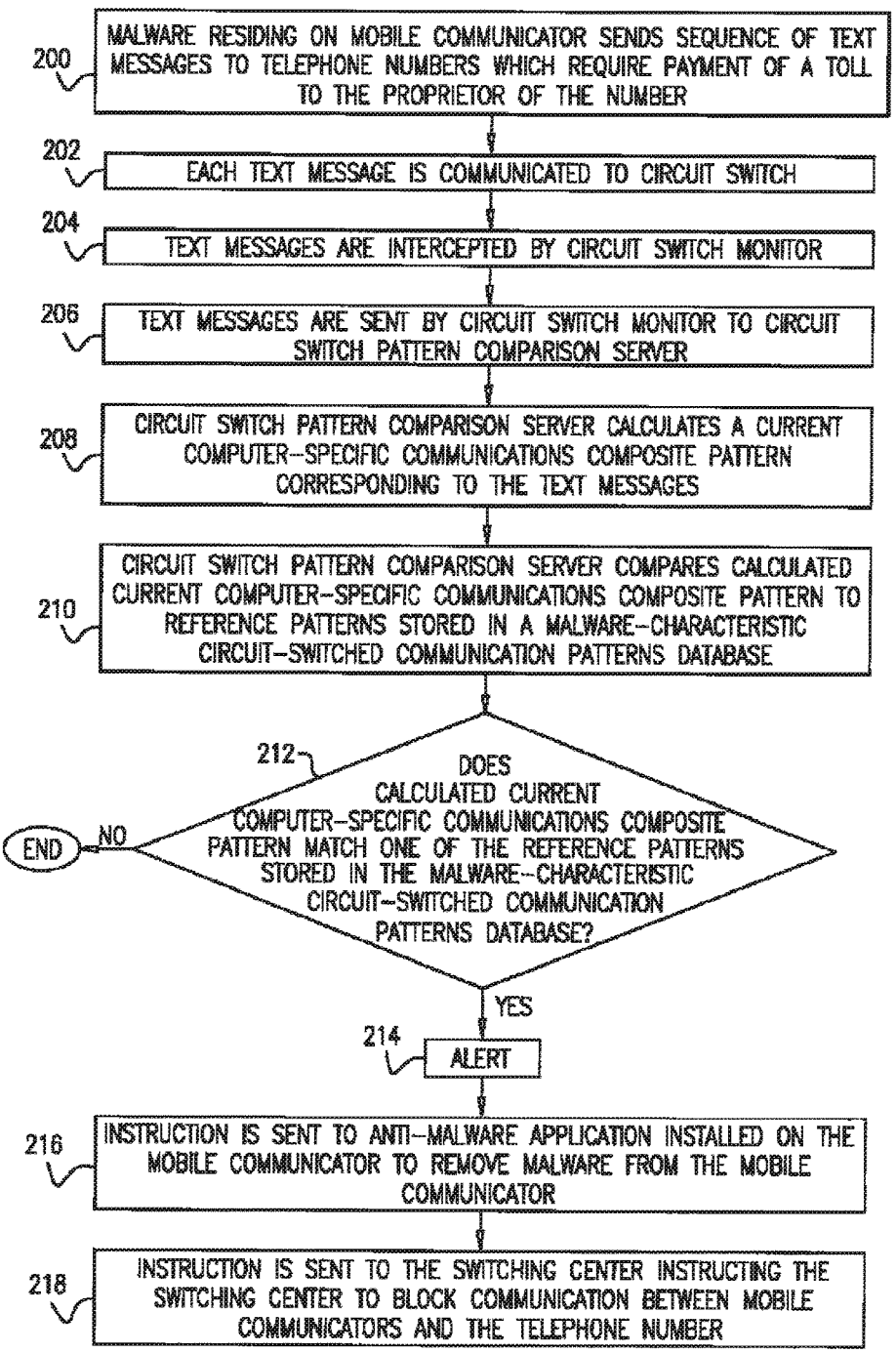
FIG. 2 is a simplified block diagram illustration of one example of steps in the operation of the system of FIG. 1.

Reference is now mode to FIG. 2, which is a simplified block diagram illustration of one example of steps in the operation of the system of FIG. 1. The example of FIG. 2 illustrates steps in detecting and prevention of sending, by a mobile communicator, a sequence of text messages to telephone numbers which require payment of a toll to the proprietor of the number.

As shown in step 200 of FIG. 2, malware which resides on a mobile communicator sends a sequence of text messages to telephone numbers which require payment of a toll to the proprietor of the number. Typically, the number of text messages in the sequence and the intervals between the text messages of the sequence is characteristic of the particular malware.

As further shown in FIG. 2, each one of the text messages is preferably communicated to a circuit switch which typically resides at a switching center (202), where they are then intercepted by a circuit switch monitor (204). Thereafter, each of the messages is sent by the circuit switch monitor to a circuit switch pattern comparison server (206). The circuit switch pattern comparison server preferably calculates a current computer-specific communications composite pattern which corresponds to the text messages (208) and compares the calculated current computer-specific communications composite pattern to reference patterns stored in a malware-characteristic circuit-switched communication patterns database (210).

Preferably, the circuit switch pattern comparison server then ascertains whether the calculated current computer-specific communications composite pattern matches one of the reference patterns stored in the malware-characteristic circuit-switched communication patterns database (212). In a case where a match between the calculated current computer-specific communications composite pattern and one of the reference patterns stored in the malware-characteristic circuit-switched communication patterns database is found, an alert is issued by the server (214). It is appreciated that the alert may be issued, for example, to the user of the mobile communicator via an anti-malware application installed on the mobile communicator, to an administrator of an organization owning the mobile communicator, or to an administrator of the switching center.

Additionally or alternatively, an instruction may be sent to the anti-malware application installed on the mobile communicator, instructing the anti-malware application to remove the malware from the mobile communicator (216).

Additionally or alternatively, an instruction may be sent to the switching center instructing the switching center to block communication between mobile communicators communicating via the switching center and the particular telephone number (218).

Figure 3:
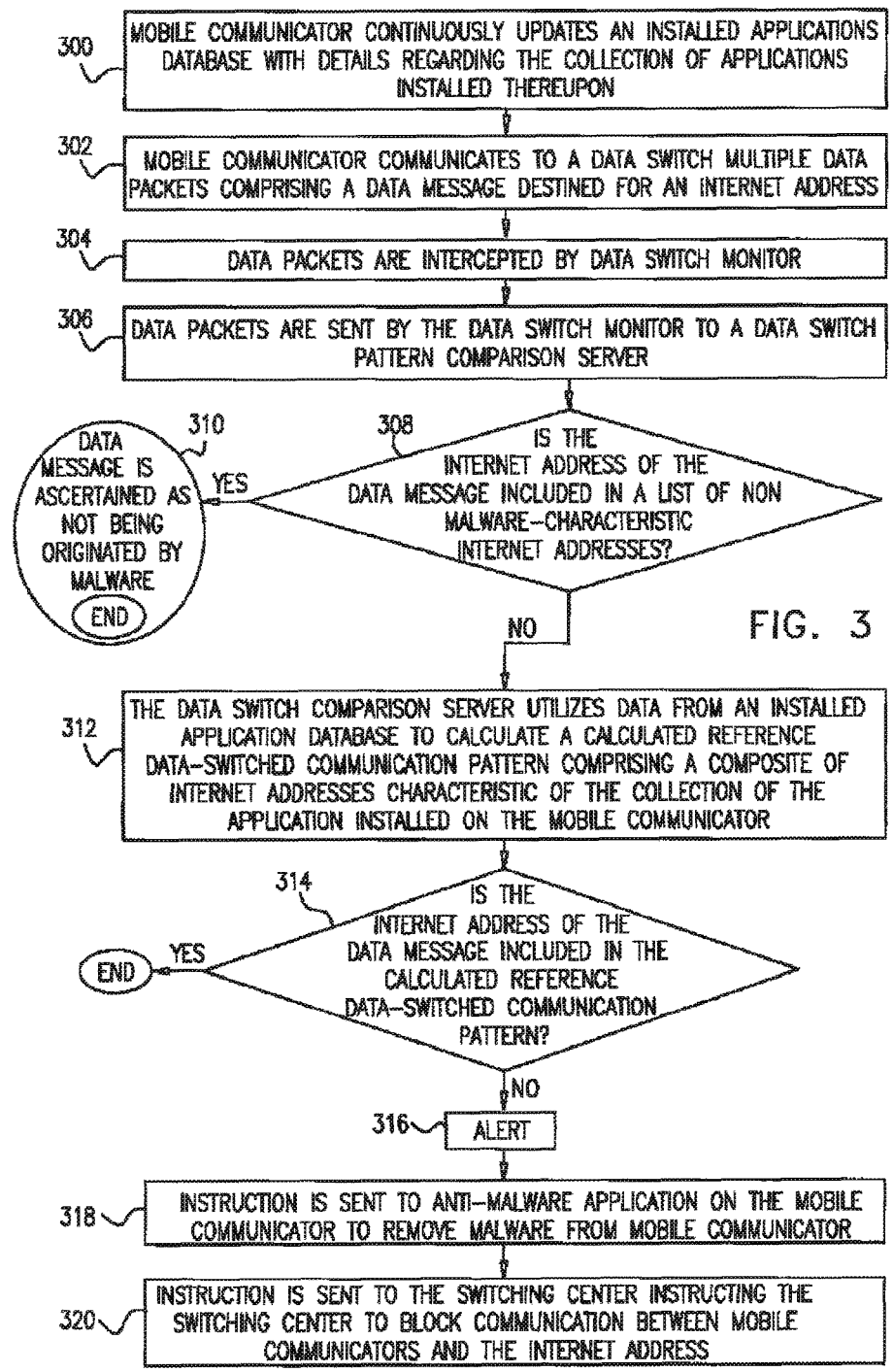
FIG. 3 is a simplified block diagram illustration of another example of steps in the operation of the system of FIG. 1.

Reference is now made to FIG. 3, which is a simplified block diagram illustration of another example of steps in the operation of the system of FIG. 1. The example of FIG. 3 illustrates detection and prevention of automatic accessing, by a given mobile communicator, of an internet address which is not one of the internet addresses known to be accessed by any of the applications known to be installed on that given mobile communicator.

As shown in step 300 of FIG. 3, a mobile communicator continuously updates an installed applications database with details regarding the collection of applications installed thereupon.

As further shown in FIG. 3, the mobile communicator communicates multiple data packets which comprise a data message to a data switch which typically resides at a switching center, which data message is destined for a particular internet address (302). The data packets are then preferably intercepted by a data switch monitor which typically resides at the switching center (304). Thereafter, the data packets are sent by the data switch monitor to a data switch pattern comparison server (306).

Thereafter, the data switch comparison server preferably ascertains whether the hamlet address of the data message is included in a list of non malware-characteristic internet addresses (308). If so, the data message is ascertained as not being originated by malware installed on the mobile communicator (310).

If the internet address of the data message is not included in the list of non malware-characteristic internet addresses, the data switch comparison server preferably utilizes data from an installed application database to calculate a calculated reference data-switched communication pattern which comprises a composite of internet addresses characteristic of the collection of the application installed on the mobile communicator (312).

Thereafter, the comparison server ascertains whether the internet address of the data message is included in the calculated reference data-switched communication pattern (314). In the case where the internet address of the data message is not included in the calculated reference data-switched communication pattern, an alert is issued by the server (316). It is appreciated that the alert may be issued, for example, to the user of the mobile communicator via an anti-malware application installed on the mobile communicator, to an administrator of an organization owning the mobile communicator, or to an administrator of the switching center.

Additionally or alternatively, an instruction may be sent to the anti-malware application installed on the mobile communicator, instructing the anti-malware application to remove the malware from the mobile communicator (318).

Additionally or alternatively, an instruction may be sent to the switching center instructing the switching center to block communication between mobile communicators communicating via the data switch of the switching center and the particular internet address (320).

Reference is now made to FIG. 4, which is a simplified block diagram illustration of yet another example of steps in the operation of the system of FIG. 1. The example of FIG. 4 illustrates detection and prevention of automatic transmission, by a given mobile communicator, of an audio file containing a sound\voice recording to an internet address which is not one of the internet addresses known to be accessed by any of the applications known to be installed on that given mobile communicator. As described hereinabove with reference to FIG. 1, automatic transmission, by a given mobile communicator, of an audio file containing a sound\voice recording to an internet address by malware installed on a given mobile communicator may be achieved, for example, by a combination of circuit-switched communication patterns and data-switched communication patterns.

As shown in step 400 of FIG. 4, a text message comprising a particular alpha-numeric code is sent to a mobile communicator via a circuit switch which typically resides at a switching center. Preferably, the text message is intercepted by a circuit switch monitor communicating with the circuit switch (402) and is sent by the circuit switch monitor to a combined circuit switch\data switch pattern comparison server (404).

It is appreciated that the system of FIG. 1 is operative, in a case where it is merely suspected that malware resides on the mobile communicator, to proactively send the text message comprising the particular alpha-numeric code to the mobile communicator in order to attempt to elicit the sequence of events typically triggered by the malware, and to thereby confirm the existence of the malware on the mobile communicator.

Thereafter, an audio file is sent by the mobile communicator to a particular IP address via a data switch which also typically resides at the switching center (406). Preferably, the audio file is intercepted by a data switch monitor communicating with the data switch (408). It is appreciated that the audio file may comprise an audio recording recorded by malware which resides on the mobile communicator in response to the text message received by the mobile communicator, and which malware is capable of utilizing audio recording functionality which is built-in to the mobile communicator to record, for example, the user of the mobile communicator.

Thereafter, the audio file is preferably sent by the data switch monitor to the combined circuit switch\data switch pattern comparison server (410). The combined circuit switch\data pattern comparison server preferably then calculates a current computer-specific communications composite pattern which preferably corresponds to the combination of the text message the audio file, and the elapsed time interval between the receipt of the text message by the mobile communicator and the sending of the audio file by the mobile communicator. (412).

Thereafter, the combined circuit switch\data switch pattern comparison server preferably compares the calculated current computer-specific communications composite pattern to reference patterns stored in a malware-characteristic combined circuit-switched\data switched communication patterns database (414), and ascertains whether there is a match between the calculated current computer-specific communications composite pattern and at least one of the reference patterns stored in the malware-characteristic combined circuit-switched\data switched communication patterns database (416).

In the case where a match between the calculated current computer-specific communications composite pattern and one of the reference patterns stored in the combined malware-characteristic circuit-switched\data switched communication patterns database is found, an alert is issued by the server (418). It is appreciated that in the example of FIG. 4, the calculated current computer-specific communications composite pattern is characteristic of a pattern associated with malware which typically causes a mobile communicator to activate, for a characteristic time interval, built-in sound\voice recording functionality via an integrated microphone associated with the mobile communicator, and to send via a data switch, following the characteristic time interval, an audio file containing the sound\voice recording to an IP address characteristic of the particular malware.

It is appreciated that the alert may be issued, for example, to the user of the mobile communicator via an anti-malware application installed on the mobile communicator, to an administrator of an organization owning the mobile communicator, or to an administrator of the switching center.

Additionally or alternatively, an instruction may be sent to the anti-malware application installed on the mobile communicator, instructing the anti-malware application to remove the malware from the mobile communicator (420).

Additionally or alternatively, an instruction may be sent to the switching center instructing the switching center to block communication between mobile communicators communicating via the data switch of the switching center and a particular internet address associated with the malware (422).

Reference is now made to Mg. 5, which is a simplified block diagram illustration of yet another example of steps in the operation of the system of FIG. 1. The example of FIG. 5 illustrates detection and prevention of downloading, by a given mobile communicator, of a mobile application from an internet address which is associated with a web site known to facilitate the download of malware.

As shown in FIG. 5, the mobile communicator communicates multiple data packets which comprise a data message to an internet address, via a data switch which typically resides at a switching center (500). The data packets are then preferably intercepted by a data switch monitor which typically resides at the switching center (502). Thereafter, the data packets are sent by the data switch monitor to a data switch pattern comparison server (504).

Thereafter, the data switch comparison server preferably ascertains whether the internet address of the data message is included in a malware-characteristic data switched communication patterns database (506). If so, the data message is ascertained as being destined for a malware-providing internet web server and an alert is issued by the server (508). It is appreciated that the alert may be issued, for example, to the user of the mobile communicator via an anti-malware application installed on the mobile communicator, to an administrator of an organization owning the mobile communicator, or to an administrator of the switching center.

Additionally or alternatively, an instruction may be sent to the anti-malware application installed on the mobile communicator, instructing the anti-malware application to block further communication between the mobile communicator and the malware providing web server (510).

It will be appreciated by persons skilled in the art that the present invention is not limited by what has been particularly shown and described hereinabove.

Rather the scope of the present invention includes both combinations and subcombinations of the various features described hereinabove as well as modifications thereof which would occur to persons skilled in the art upon reading the foregoing description and which are not in the prior art.

The invention claimed is:

1. A method for detecting malware comprising:
    storing, on at least one database, remote from a plurality of computers to be protected:
        identification of computer applications resident on each of said computers to be protected; and,
        an application-specific communications footprint for each of said computer applications;
    calculating a reference computer-specific communications composite pattern based on multiple application-specific communications footprints for applications installed on each of said computers to be protected;
    calculating a current computer-specific communications composite pattern based on actual communications of at least one of said plurality of computers to be protected;
    providing an alert when said current computer-specific communications composite pattern of said at least one of said plurality of computers to be protected differs from said reference computer-specific communications composite pattern of said at least one of said plurality of computers to be protected as indicated by at least one metric;
    storing, on a malware-characteristic circuit switched communication patterns database, malware-characteristic circuit switched communication patterns which are characteristic of at least one of imminent installation, presence and operation of malware on said plurality of computers to be protected;
    monitoring a circuit switch for sensing current circuit switched communication patterns being communicated via said circuit switch; and,
    comparing said current circuit switched communication patterns sensed by said monitoring said circuit switch with said malware-characteristic circuit switched communication patterns stored on said malware-characteristic circuit switched communication patterns database, and providing an alert when at least one of said current circuit switched communication patterns is similar to at least one of said malware-characteristic circuit switched communication patterns as indicated by at least one metric.

2. A method for detecting malware according to claim 1, additionally comprising: proactively sending at least one malware triggering message to at least one of said plurality of computers to be protected in order to attempt to elicit communication of at least one of said malware-characteristic circuit switched communication patterns by said at least one of said plurality of computers to be protected, and to thereby confirm the existence of at least one of imminent installation, presence and operation of malware on said at least one of said plurality of computers to be protected.

3. A method for detecting malware according to claim 1, additionally comprising: monitoring at least one of said plurality of computers to be protected for information relating to the state of said at least one of said plurality of computers to be protected, wherein said current circuit switched communication patterns also include said information relating to said state of said at least one of said plurality of computers to be protected.

4. A method for detecting malware according to claim 3, wherein said information relating to said state of said at least one of said plurality of computers to be protected comprises at least one of an on\off state of a screen of said at least one of said plurality of computers to be protected, a type of wireless connection or protocol utilized by said at least one of said plurality of computers to be protected to communicate with said circuit switch and whether said at least one of said plurality of computers to be protected is connected to an electrical charger.

5. A method for detecting malware according to claim 1, wherein at least some of said malware-characteristic circuit switched communication patterns are computer-type specific.

* * * * *